US011709956B2

(12) United States Patent
Kraemer

(10) Patent No.: US 11,709,956 B2
(45) Date of Patent: Jul. 25, 2023

(54) SECURE DATA BROKER

(71) Applicant: Accenture Global Solutions Limited, Dublin (IE)

(72) Inventor: Eric J Kraemer, Aliso Viejo, CA (US)

(73) Assignee: Accenture Global Solutions Limited, Dublin (IE)

( * ) Notice: Subject to any disclaimer, the term of this patent is extended or adjusted under 35 U.S.C. 154(b) by 127 days.

(21) Appl. No.: 16/838,153

(22) Filed: Apr. 2, 2020

(65) Prior Publication Data

US 2020/0327245 A1 Oct. 15, 2020

Related U.S. Application Data

(60) Provisional application No. 62/833,937, filed on Apr. 15, 2019.

(51) Int. Cl.
*G06F 21/00* (2013.01)
*G06F 21/62* (2013.01)
*G06F 21/31* (2013.01)
*G06F 16/11* (2019.01)

(52) U.S. Cl.
CPC ........ *G06F 21/6218* (2013.01); *G06F 16/125* (2019.01); *G06F 21/31* (2013.01)

(58) Field of Classification Search
CPC .... G06F 21/6218; G06F 21/125; G06F 21/31; G06F 16/125; H04L 63/0263; H04L 63/10; H04L 63/101; H04L 63/102; H04L 63/105; H04L 63/107; H04L 63/108
See application file for complete search history.

(56) References Cited

U.S. PATENT DOCUMENTS

| 10,205,594 | B1* | 2/2019 | Kaufman | H04L 9/0822 |
| 11,128,438 | B1* | 9/2021 | Konda | H04L 63/0263 |
| 2011/0246519 | A1* | 10/2011 | Jansen | G06F 16/2471 |
| | | | | 707/E17.014 |
| 2019/0349733 | A1* | 11/2019 | Nolan | H04W 12/69 |
| 2022/0060514 | A1* | 2/2022 | Hu | H04L 63/06 |

FOREIGN PATENT DOCUMENTS

GB 2567499 * 4/2019 ............. H04L 12/58

* cited by examiner

*Primary Examiner* — Joseph P Hirl
*Assistant Examiner* — Chi D Nguy
(74) *Attorney, Agent, or Firm* — Fish & Richardson P.C.

(57) ABSTRACT

The present disclosure is directed to for secure data access between multiple entities, and includes actions of receiving, by a secure file storage system, a set of metafiles including one or more metafiles that define actions to be performed and conditions to be satisfied before granting a first system use of data that is resident at a second system, the set of metafiles being provided by the second system, receiving, by the secure file storage system and from a central exchange, an indication that the actions are performed and the conditions are satisfied for use of the data by the first system, wherein the central exchange accesses the set of metafiles from the secure file storage without accessing the data, and in response to the indication, permitting use of the data by the first system.

21 Claims, 9 Drawing Sheets

SECURE DATA BROKER

CROSS-REFERENCE TO RELATED APPLICATIONS

This application claims priority to U.S. Prov. App. Ser. No. 62/833,937, filed on Apr. 15, 2019, which is expressly incorporated herein by reference in the entirety.

BACKGROUND

Entities often work together in cooperative efforts. For example, multiple enterprises may work together to achieve some end. In some instances, cooperative efforts can require an exchange of information. In such instances, it can occur that sensitive information needs to be exchange. For example, information (data) that is proprietary and confidential to one enterprise may need to be shared with another enterprise to enable the enterprises to execute tasks as part of a cooperative effort. Example sensitive information can include intellectual property (e.g., source code, customer information, employee information, production information, sources, vendors) and personal identifiers (PIDs). Consequently, systems should be provided to ensure the security of the information, as well as the proper use of the information by a receiving enterprise.

SUMMARY

According to an innovative aspect of the subject matter described in this application, a method for implementing a secure data broker includes actions of receiving, by a secure file storage system, a set of metafiles including one or more metafiles that define actions to be performed and conditions to be satisfied before granting a first system use of data that is resident at a second system, the set of metafiles being provided by the second system, receiving, by the secure file storage system and from a central exchange, an indication that the actions are performed and the conditions are satisfied for use of the data by the first system, wherein the central exchange accesses the set of metafiles from the secure file storage without accessing the data, and in response to the indication, permitting use of the data by the first system.

These and other implementations can each optionally include one or more of the following features: the set of metafiles includes an authentication metafile that identifies one or more users of the first system allowed to use the data; the set of metafiles includes a secure data metafile that provides one or more links to enable access to the data to enable the first system to use the data; the set of metafiles includes a data processing metafile that provides computer-executable instructions that are executed for use of the data by the first system; the set of metafiles is generated by a secure data broker that is resident on an edge node of the second system, the edge node transmitting the set of metafiles to the secure file storage system; the data is associated with an expiration, and after the expiration, the data is no longer usable by the first system based on the set of metafiles; and the secure file storage system is provided by a cloud-computing platform that enables indirect communication between the second system and the central exchange to enable use of the data by the first system.

Other implementations of this aspect include corresponding systems, apparatus, and computer programs recorded on computer storage devices, each configured to perform the operations of the methods.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure or directed to secure sharing of data in geographically distributed, multi-party distributed data sources. More particularly, implementations of the present disclosure provide a secure data broker that enables secure sharing of data between multiple parties. As described in further detail herein, the secure data broker of the present disclosure leverages distributed ledger technology (also referred to as blockchain technology) as an asynchronous meta-broker for contracts that govern the access, management, and processing of distributed data sets. In some implementations, the contracts are file-based objects that are written to a managed distributed ledger by data owners. In some examples, contracts can define analytical processing jobs (e.g., math, statistics, set-based operations) and associate rules (e.g., expiry, encryption, obfuscation) that govern a receiving party's use of the data with each job.

Figure 1:
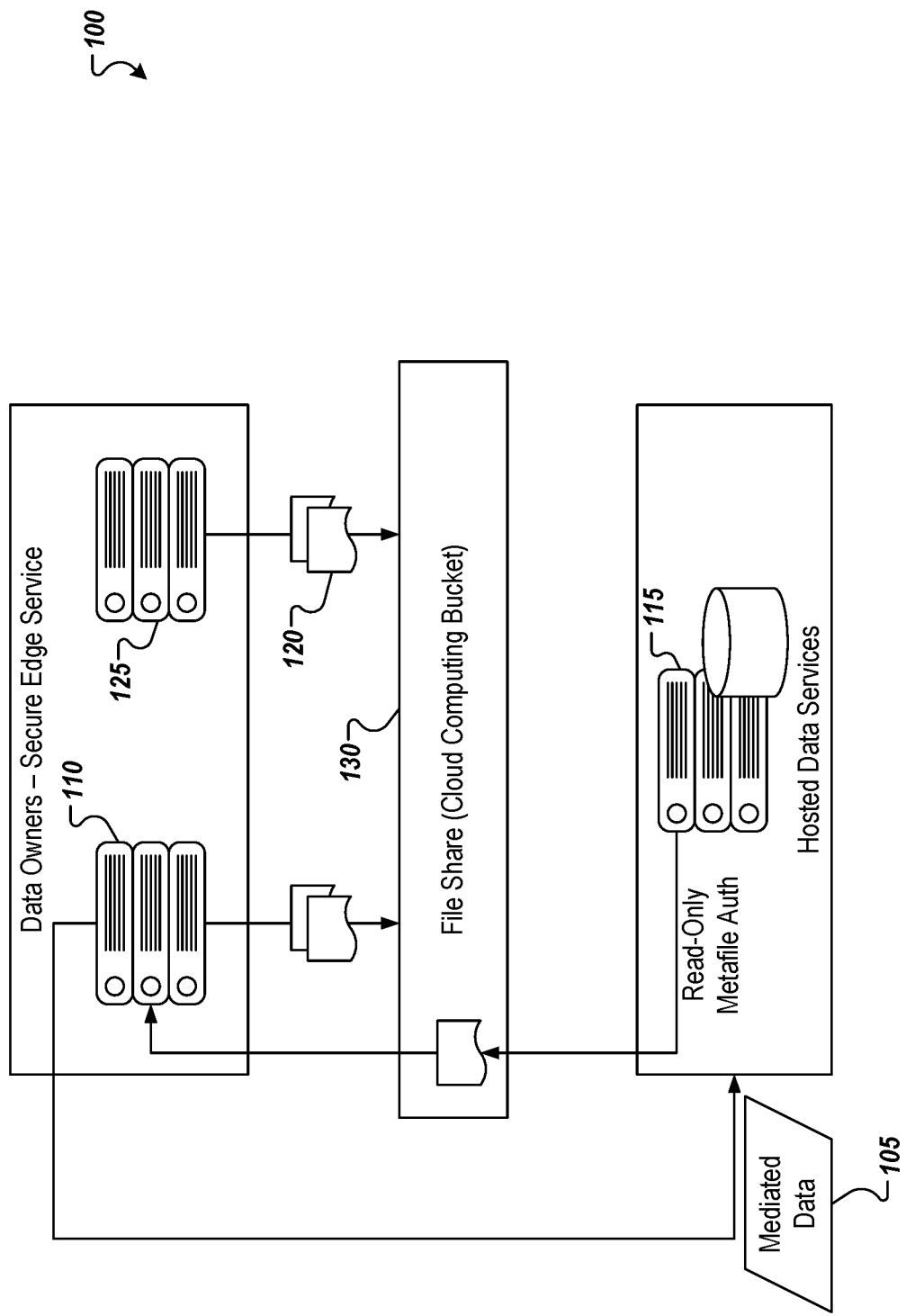
FIG. 1 illustrates an example system for asynchronous data access and distributed data processing in accordance with implementations of the present disclosure.

FIG. 1 illustrates an example system 100 for asynchronous data access and distributed data processing. The system 100 includes a central exchange service 115, a secure edge server 110, and another secure edge server 125. The central exchange service 115, the secure edge server 110, and the secure edge server 125 communicate through a secure file share 130. In some examples, the secure file share 130 is provided as a so-called cloud computing bucket, which can be described as Internet-based data storage that provides a web services interface that can be used to store and retrieve data. An example cloud computing bucket includes, without limitation, buckets provided in Amazon Simple Storage Service (S3) provided by Amazon, Inc. as part of an Amazon Web Services (AWS) offering. The secure edge servers 110 and 125 use metafiles 120 as a means of providing instructions and requirements for accessing data 105 stored by the secure edge servers 110 and 125.

The secure edge server 110 or 125 contains a secure data broker (SDB) that is configured to perform several functions. A first function is creating and managing metafiles 120. Metafiles 120 identify and provide instructions for granting and revoking access to data 105. Metafiles 120 are not a system, but rather the output of the secure data broker. A second function is creating and managing secure keys, associated keys, and an authentication policy with objects that contain data 105, for example a file or a link to a file. A third function is writing to the secure file share 130 that can store metafiles 120 and may be a computer file system with network accessibility. A fourth function is periodically scanning files in the secure file share 130 for access request notifications written by a secure data broker that is included in the central exchange server 115. A fifth function is not accepting or creating direction connections to the central exchange service 115.

A sixth function is initiating metafile-based data transfer instructions after certain conditions are met. A first condition is that the edge SDB (i.e., the SDB on the secure edge server) has read a validated access request notification. A second condition is that all required authorization steps listed in the associated metafile 120 have been successfully completed. A third condition is that all required data processing steps listed in the associated metafile 120 have been successfully completed. Once the first, second, and third conditions are met, the data item 105, which may be considered "mediated data," is sent to a location described in the metafile 120. The location may or may not be a destination that is under the direct management or access of the central exchange service 115.

As noted above, the central exchange service 115 contains a secure data broker that is configured to perform several functions. A first function is that the SDB on the central exchange service 115 has read access to metafiles 120 (i.e., read-only access, so it cannot create or edit metafiles 120). A second function is providing a web-based client interface that allows for user authentication and registration. Users may be invited to join a central exchange by owners of a secure edge server 125. A third function is periodically scanning files in the secure file share 130 to look for data transfer authorization keys within metafiles 120 that match registered users of the central exchange service 115. A fourth function is notifying registered central exchange users of any outstanding authorization notifications. A fifth function is writing access request notifications to the secure file share 130 that can include a secure key exchange for further authentication by the SDB on the secure edge server that wrote the initiating access request notification.

A primary role of the central exchange service 115 is to provide a portal for registered users that (i) gives visibility into data access grants by owners and/or administrators of secure edge servers through authorization instructions contained in a metafile 120 and (ii) enables registered users to post access requests to the secure file share 130 only if they have initially received an authorization notice from a secure edge server owner or administrator. A registered user may be any user identified in a metafile 120 created by a secure edge server owner or administrator.

The system 100 is set up such that secure edge brokers of the secure edge servers 110 and 125 never have a direct network connection to the central exchange service 115, yet still enable wide-area, asynchronous network-based communication through files written to the secure file share 130 with the purpose of enabling processing and then transferring of owner-identified data sets and/or objects. As described herein, the system 100 uses a process then transfer paradigm. Data 105 may not be moved until all metafile 120 instructions are processed. This ensures all security policy and data processing demands, such as encryption, obfuscation, analytics, and the like are processed before the data 105 leaves the owner's custody.

Figure 2:
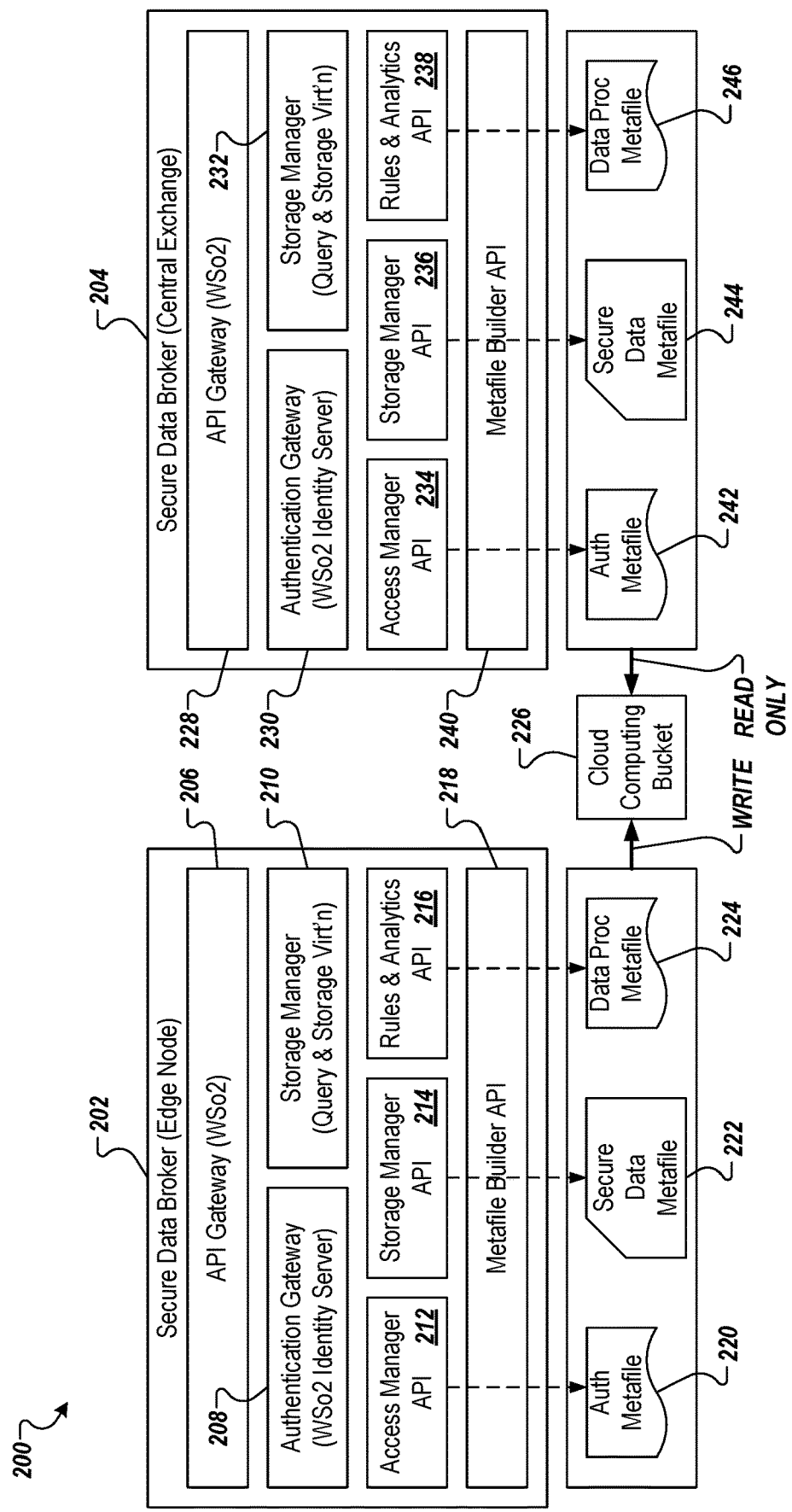
FIG. 2 illustrates example architectures of an edge node and a central exchange of the system for asynchronous data access and distributed data processing in accordance with implementations of the present disclosure.

FIG. 2 illustrates example architectures of an edge node 202 and a central exchange 204 of the system 200 for asynchronous data access and distributed data processing. The edge node 202 may be the same as or similar to the secure edge servers 110 and 125 of FIG. 1. The central exchange 204 may be the same as or similar to the central exchange service 115 of FIG. 1.

The role of the edge node 202 is to manage independent site-level security and data policy while remaining loosely coupled to the central services. An edge server running the edge node software can contain a multi-region partition of identify services, a self-contained storage manager service that mirrors central server technology, and an application programming interface (API).

The edge node 202 includes an API gateway 206, an authentication gateway 208, and a storage manager 210. The edge node 202 includes an access manager API 212 that is configured interact with the metafile builder API 218 to generate the authorization metafile 220. The authorization metafile 220 includes instructions for providing access to a targeted system and/or network. The targeted system and/or network can include access to data stored on the targeted system.

The edge node 202 includes a storage manager API 214 that is configured to interact with the metafile builder API 218 to generate the secure data metafile 222. The secure data metafile 222 includes the properties of the data that corresponds to the metafiles 220, 222, and 224, the location of the data, and the access permissions of the data.

The edge node 202 includes a rules and analytics API 216 that is configured to interact with the metafile builder API 218 to generate the data processing metafile 224. The data processing metafile 224 includes instructions and/or rules for processing the data that corresponds to the metafiles 220, 222, and 224. In some implementations, the data processing metafile 224 includes code that the accessing system, the edge node 202 and/or the central exchange 204 can execute.

In other words, the metafiles 220, 222, and 224 are an abstraction of a specific, heterogeneous system involving user authorization and data processing functions. The metafiles 220, 222, and 224 are abstraction of heterogeneous software code. The metafiles 220, 222, and 224 are an abstraction of heterogeneous system metadata that can include parameters, expressions, configurations, and the like. For example, the metafiles 220, 222, and 224 are an abstraction of a list of network IP addresses, parameters, and expressions specific to an given FTP client, and the like. The metafiles 220, 222, and 224 are a unique file-based container with unique markup language, for example, metafile orchestration instructions.

The data stored by each edge node 202 corresponds to an authentication metafile 220, a secure data metafile 222, and a data processing metafile 224. By splitting authentication, security, and processing functionality, the edge node 202 provides a data owner the ability to define and attach authorization and data processing instructions to a specific set of data. The data owner shares the authentication metafile 220, the secure data metafile 222, and the data processing metafile 224 without sharing the data.

The edge node 202 provides the authentication metafile 220, the secure data metafile 222, and the data processing metafile 224 to a cloud computing bucket 226. In some implementations, the cloud computing bucket 226 is an online file sharing service (e.g., a bucket of Amazon S3, introduced above). The central exchange 204 is able to access the authentication metafile 220, the secure data metafile 222, and the data processing metafile 224 from the cloud computing bucket 226.

In some implementations, any edge node can create the authentication metafile 220, the secure data metafile 222, and the data processing metafile 224. Once created, the authentication metafile 220, the secure data metafile 222, and the data processing metafile 224 cannot be modified. In some instances, existing contracts may be used as a template for the authentication metafile 220, the secure data metafile 222, and the data processing metafile 224 with any changes creating a new contract. In some instances, contracts may be manually expired or have a preset expiration data. The cloud computing bucket 226 may provide for secure data brokering between the edge node 202 and the central exchange 204, as described in detail herein.

The central exchange 204 includes an API gateway 228, an authentication gateway 230, and a storage manager 232. The central exchange 204 includes an access manager API 234 that is configured to interact with the metafile broker 240 to access the authentication metafile 242 from the cloud computing bucket 226. The central exchange 204 includes an data manager API 236 that is configured to interact with the metafile broker 240 to access the secure data metafile 244 from the cloud computing bucket 226. The central exchange 204 includes a rules and analytics API 238 that is configured to interact with the metafile broker 240 to access the authentication metafile 242 from the cloud computing bucket 226.

The central exchange 204 is a cloud-based system or an on-premise system. The central exchange 204 provides for direct queries against data sets that are defined by the secure data contracts in the cloud computing bucket 226. A query may be, for example, a structured query language (SQL) query and may be based on, for example, a PrestoDB query engine on top of a managed virtual storage layer that supports multiple file and database storage formats.

As an example, two companies may be working together on a project that requires that the first company share sensitive data with the second company. The sensitive data may be data that the first company wishes to maintain tight control over and ensure that the data is only used by the second company for the project. The first company may store the data on the edge node 202 and generate the authentication metafile 220, the secure data metafile 222, and the data processing metafile 224 that specify the terms and rules for sharing the data. For example, the rules may include what employees of the second company are authorized to view the data. The rules may include a requirement for encrypting the data before sharing the data with the second company. The rules may indicate that the second company may only access or view the data on the central exchange 204. The rules may also indicate that the data should be deleted after a certain period of time after the second company accesses the data.

The configuration of the system 200 allows the metafiles 220, 222, and 224 associated with the data stored on the edge node 202 to be shared with anyone who has access to the cloud computing bucket 226, while the data remains on the edge node 202. If someone accesses the metafiles 220, 222, and 224 on the cloud computing bucket 226, then the data continues to remain on the edge node 202 until all of the conditions of the metafiles 220, 222, and 224 are met. The rules and instructions of the metafiles 220, 222, and 224 are defined by the owner of the data and the edge node 202, and the owner is responsible for ensuring that the rules and instructions are executed before sharing the data. In some implementations, the rules and instructions are a rule to store the data in a specific database and include code that can only execute in that specific database.

The configuration of the system 200 allows authorization regarding data access and data security to be abstracted away from a specific operating system, database, etc. The processing of the data is also abstracted from a specific operating system, database, etc. The system 200 does not move any data from the edge node 202 until the system 200 has followed all instructions and rules of the metafiles 220, 222, and 224.

Figure 3:
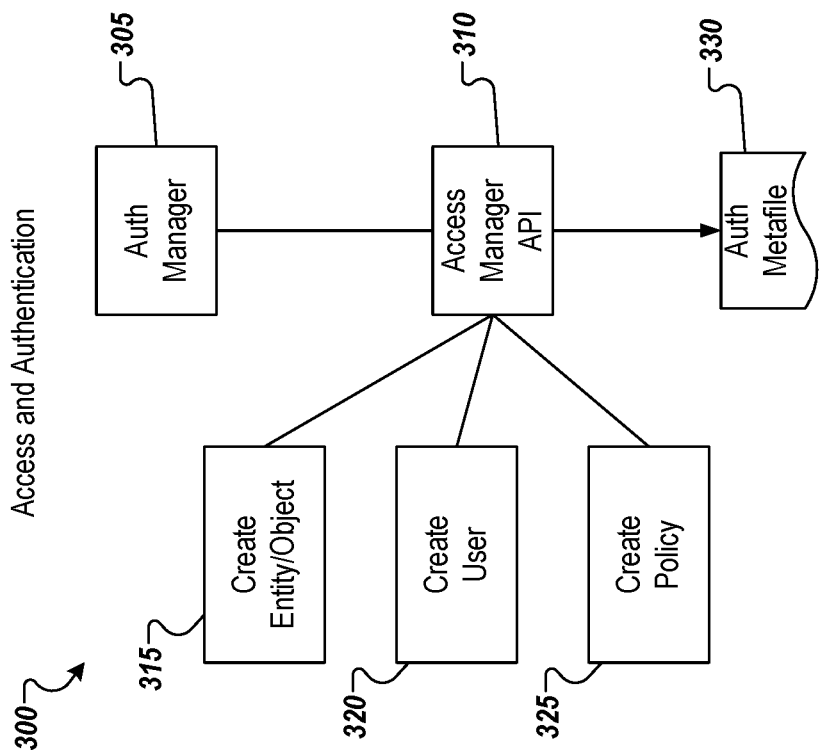
FIG. 3 illustrates an example process of generating an authentication metafile used by the system for asynchronous data access and distributed data processing in accordance with implementations of the present disclosure.

FIG. 3 illustrates an example process 300 of generating an authentication metafile 330 used by the system for asynchronous data access and distributed data processing. The authentication metafile 330 may be the same as or similar to the authentication metafiles 220 and 242 of FIG. 2.

The process 300 is performed by at least one of the authentication manager 305 and the access manager API 310. The access manager API 310 may be the same as or similar to the access manager API 212 and/or the access manager API 234 of FIG. 2. The access manager 310 creates an entity and/or object (315), creates user permissions (320), and creates a policy (325). The access manager 310 generates the authentication metafile 330.

In some implementations, the authentication metafile 330 includes an access model and policy for entities, objects, and users. The access policy can be associated with a unique file identifier that is included in the metafiles. In some implementations, each node has a unique master entity that indicates the owner of the edge node. In some instances, a unique file identifier created on an edge node can always be securely identified as originating from that specific node and the corresponding master entity. In some instances, an authentication policy can only be created for files that are native to the edge node.

Figure 4:
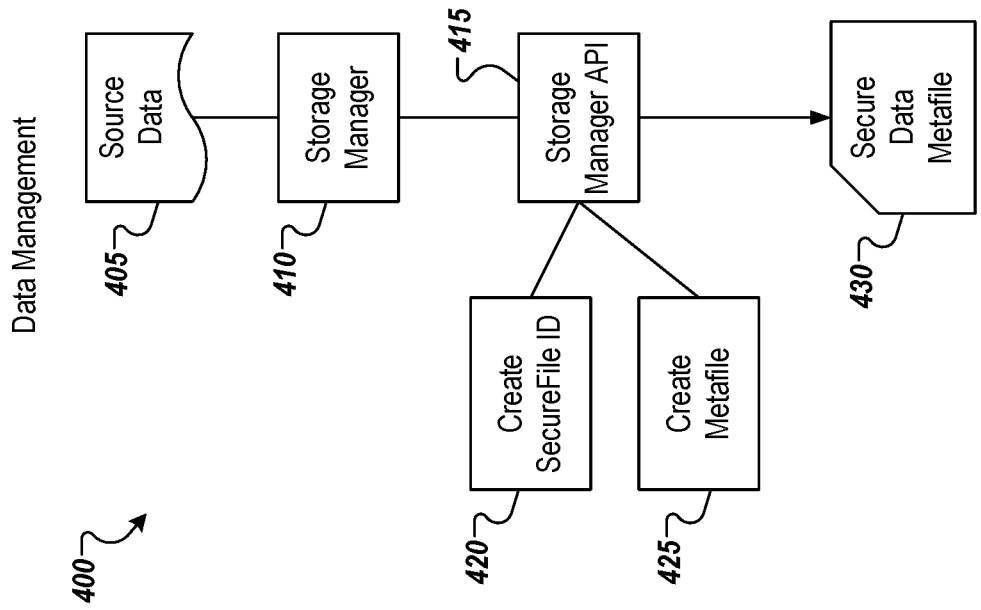
FIG. 4 illustrates an example process of generating a secure data metafile used by the system for asynchronous data access and distributed data processing in accordance with implementations of the present disclosure.

FIG. 4 illustrates an example process 400 of generating a secure data metafile 430 used by the system for asynchronous data access and distributed data processing. The secure data metafile 430 may be the same as or similar to the secure data metafiles 222 and 244 of FIG. 2.

The process 400 is performed by at least one of the storage manager 410 and the storage manager API 415. The storage manager 410 and/or the storage manager API 415 may be the same as or similar to the storage manager API 214 and/or the storage manager API 236 of FIG. 2. The storage manager API 415 processes the source data 405 and creates a secure file identifier (420) and creates a metafile (425). The storage manager API 415 generates the secure data metafile 430.

In some implementations, the process 400 includes identifying the data of interest. The secure file identifier may have cryptographic properties such that the identifier can be independently verified from any valid system instance. In some implementations, the system 400 may leverage a template and the secure data metafile 430 is created by an authorized user.

Figure 5:
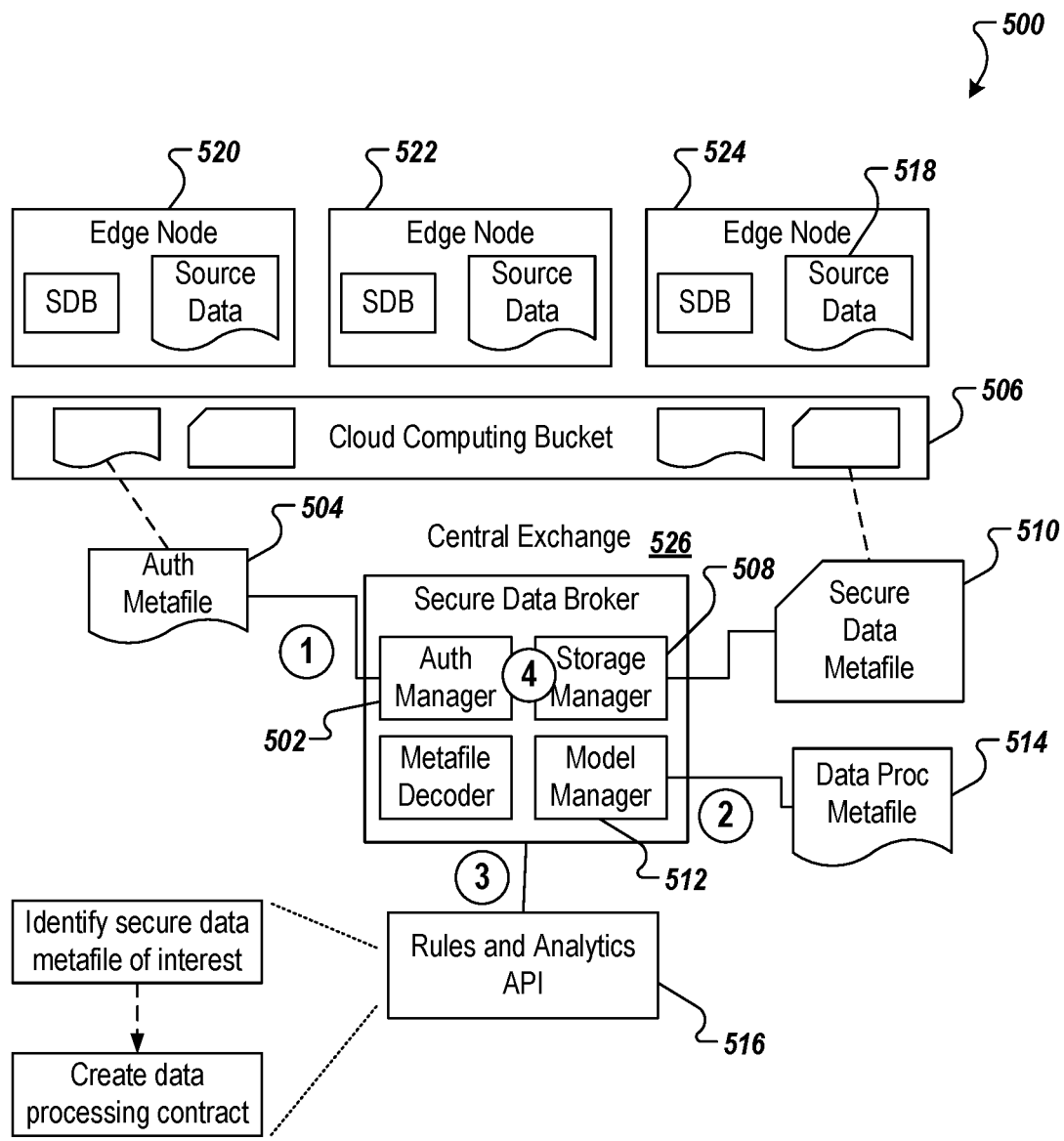
FIG. 5 illustrates an example data access and processing by the system for asynchronous data access and distributed data processing in accordance with implementations of the present disclosure.

FIG. 5 illustrates an example data access and processing by the system 500 for asynchronous data access and distributed data processing. The system 500 may be the same as or similar to the system 100 of FIG. 1 or the system 200 of FIG. 2. As depicted in FIG. 5, the system 500 includes a central exchange 526 that includes a secure data broker (SDB), described in detail herein with reference to FIG. 2.

In some implementations, after an edge node stores a set of metafiles to a cloud computing bucket 506, in a first stage (1), an authentication manager 502 of the SDB reads the authentication metafile 504 from the cloud computing bucket 506. In a second stage (2), the storage manager 508 reads the secure data metafile 510 from the cloud computing bucket 506, and the model manager 512 reads the data processing metafile 514 from the cloud computing bucket 506. In a third stage (3), the rules and analytics API 516 request to access data 518. That request triggers the authentication and data processing that results in the data 518 being delivered to the storage manager 508 in a fourth stage (4), if authenticated. If not authenticate, an authentication failure is flagged.

In some implementations, the architecture of system 500 allows for no direct connection between edge nodes and the central exchange. Metafiles facilitate an asynchronous abstraction for authorization/identity services, data processing, data transfer, query services, and execution of code functions and rules. In some instances, the cloud computing bucket 506 is used as an intermediary to hold metafiles and support indirect exchange of metafiles between edge nodes 520, 522, and 524 and the central exchange 526. Edge node authorization and identity may be opaque to the central exchange 526. In other words, the central exchange 526 has no master list of approved or unapproved users or objects. No information sharing should happen outside of a metafile.

Figure 6:
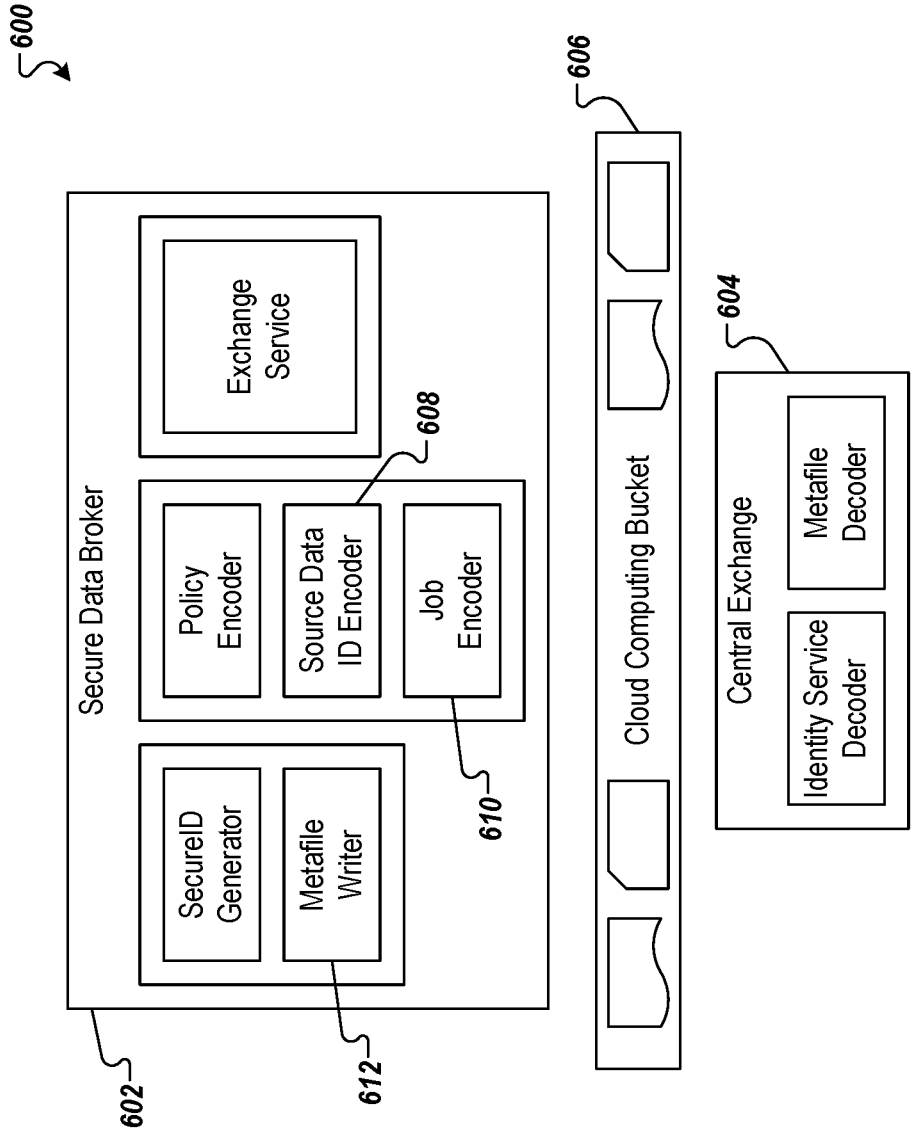
FIG. 6 illustrates an example secure data broker and central exchange of the system for asynchronous data access and distributed data processing in accordance with implementations of the present disclosure.

FIG. 6 illustrates an example secure data broker 602 and central exchange 604 of the system 600 for asynchronous data access and distributed data processing. The system 600 may be the same as or similar to the system 100 of FIG. 1, the system 200 of FIG. 2, and the system 500 of FIG. 5.

In some implementations, a secure data broker (SDB) 602 of an edge node is used to establish an data model (e.g., entity model, object model) and an authorization policy associated with the data model. This establishes an organization and users access/security policy. In some implementations, location(s) of data set(s) of interest (i.e., data that is to be shared), such as data the users wish to make available to the secure data exchange. These sets of data are given universally unique identifiers (UUIDs). The source data identifier encoder 608 creates a reference that links access/location instructions for the data set(s) with the unique identifier in an object/structure and the reference is included in a metafile (e.g., secure data metafile).

In some implementations, data processing instructions are created within the job encoder 610. These jobs may contain software code. The system 600 will process instructions, parameters, expressions, rules, etc. that govern how a designated set of data will be processed, if accessed and authorized. Each job may be assigned a UUID. A metafile may reference one or more jobs (e.g., data processing (proc) metafile). In some implementations, a metafile may only reference jobs created within the same secure data broker as the data set being referenced.

In some implementations, metafiles can be created using the metafile writer 612. The metafile may include an authorization policy and reference a data set of interest that may have been created by the file encoder 608, and a data processing job that may have been created by the job encoder 610. Users may publish a metafile using this service (e.g., encoding as a transaction and compatible with a given distributed ledger).

In some implementations, the central exchange 604 enables authorization and metafile validation for the secure data broker 602 and other secure data brokers (e.g., of other edge nodes). The central exchange 604 may only read a metafile, if the originating secure data broker has enabled a corresponding central exchange service.

In some implementations, if authorized, the central exchange 604 can decode the metafile authentication policy and facilitate authorization with an identity service. With appropriate authorization, the central exchange 604 will activate a listener and wait for the edge node to transmit data after local application of the metafile instructions. The central exchange 604 can create a transaction noting the execution of the metafile, if the cloud computing bucket 606, or a similar transaction audit mechanism is being used.

In more detail and in some database and data management systems, an authentication and policy may be integrated into the operating system and the database server. Support to pass credentials from third-party authentication services may vary, but should be integrated directly with the operating system or database. In some implementations, the authentication services are first-party services and are tied to the user logging in. The policy may be tied to user authentication. In some implementations, the policy may be tied to the user. The system may be unable to dynamically inherit third-party policy modifications. In some implementations, the policy may be stored in the target system. The system may not support dynamically support exporting policy data across different systems. In some implementations, query and/or code is stored as a procedure or provided via a direct interface, or stored as a file. Metadata, such as data structure, labels, types, etc., is stored in a structure compatible with the source system.

In some implementations, rules and events may be stored in a variety of ways. Rules and events may be stored as code within the database, for example, stored procedures. Rules and events may be stored as triggers with basic even logic. This can be scheduled within some database systems. Rules and events may be stored as code managed outside of the database compiled into runtimes or stored as files and executed as needed in a runtime environment. Rules and events may be stored as a development operations jobs workflow managed by a tool. Rules and events may be stored as meta-objects describing math, algorithm, or code expressions, rules, time, and events as ordered workflows in a job manager.

The secure data broker abstracts key aspects of the functional capabilities listed above from operating systems, data management systems, and file systems. It accomplishes this by storing information necessary to facilitate authorization, data distribution, and data processing execution in a metafile. Metafiles store instructions that include expressions, commands, instructions etc. and that are compatible with targeted systems such as syntax recognizable by a database. Metafiles store rules and events. This can be in the form of code, such as python code, or instruction sets compatible with a development operations scheduler or rules engine. Metafiles store identity models and associated policy, for example, an entity-object model and associated policy compatible with WSo2 identity manager. Metafiles store storage actuation parameters, for example, the instructions to FTP GET/PUT a file of interest. This may include a combination of network and file system related metadata.

Metafiles have unique properties. Each metafile can be referenced by a unique identifier with specific properties. The identifier may be universally unique with no centralized management. This means that any number of instances of a secure data broker may exist and create unique identifiers without any interaction with each other. For example, these unique identifiers may have a probability of duplication no greater than 0.005 in 1000 years for up to 100,000 deployed brokers. The identifier may have cryptographic properties such that it cannot feasibly be reverse engineered or duplicated by a third party. A part of the identifier must allow the central exchange service to identify that a valid secure data broker instance created it without requiring the central exchange to maintain a master list of all secure data brokers, whether or not such a list is maintained may be a security consideration and is thus optional. A part of the identifier should carry enough information to enable a communication path and key exchange between a central exchange instance and the originating secure data broker. A part of the identifier must carry an expiry condition. This can be expressed in time or by code expression. In some instances, metafiles are encrypted when stored or transmitted. Metafiles may be no larger than a particular size when compresses and encrypted, such as 512 kb.

Metafiles may enable various system processes. Metafiles may enable independent distribution of computer system access policy and authorization tightly coupled to a set of data. Metafiles may enable independent distribution of data processing rules, expressions, parameters, and conditions tightly coupled to a set of data. Metafiles may enable self-identifying and verifying properties. Metafiles may enable tamper resistant encapsulation. Metafiles have a high probability of uniqueness in that no two Metafiles share the same identifier despite loosely coupled broker and exchange service architecture.

Encoded and encrypted metafiles can be written to a distributed ledger as a transaction. This is one means of asynchronously distributing computer system authorization, data processing, and data transmission and storage policies and instructions in a form that is abstract from individual system requirements. The metafile may contain appropriate instructions for the intended recipients such as users and systems. The distributed ledger provides benefits for audit and distribution at scale, but this is not the only means of exchanging metafiles between a secure data broker and central exchange service.

The system may use blockchain as the distributed ledger. The system may store data in the blockchain as a transaction. Identity management services may not be an intrinsic element of the chain, although identity is implied through algorithmic completion. Authorization is algorithmically intrinsic to use of the blockchain, and this also applies to identity management to a degree. Blockchain is abstractly objective, for example, no value-based policy is possible. Data is valid or not based on one and only one rule, the rule that completes the chain.

There are some conceptual similarities between the concept of smart contracts within or outside of blockchain applications and the metafile). Smart contracts may be self-verifying, self-executing, and tamper resistant. Metafiles are not intrinsically self-verifying, self-executing or tamper resistant. Metafiles are an abstraction of a specific, heterogenous system user authorization and data processing functions, an abstraction of heterogenous software code, an abstraction of heterogenous system metadata parameters, expressions, and configurations, such as a list of network IP addresses, parameters, and expressions specific to an given FTP client, etc., and a unique file-based container with unique markup language, such as metafile orchestration instructions.

In some instances, smart contracts can turn legal obligations into automated processes, and a metafile alone cannot do this. A metafile could contain a set of instructions and parameters, that combined with a target system could turn a specific legal obligation into a process. To make this automated, however, the system would need to automate the creation of the metafile and then automate the delivery and execution in the target system.

In some instances, smart contracts can guarantee a greater degree of security. This may be contextual. If combined with blockchain a metafile could be engineered to offer similar security characteristics as a given smart contract implementation but it would not provide this level of functionality intrinsically. However, the metafile itself has some unique features that add to security that would not be found in a standard smart contract, such as the UUID and its cryptographic properties.

In some instances, smart contracts can reduce reliance on trusted intermediaries. This may be a benefit of distributed ledgers, such as blockchain, and not a benefit of either smart contracts or metafiles. In some instances, smart contracts can lower transaction costs. The metafile is not intended as a vehicle/container for commercial transactions.

In some implementations, a blockchain may replace the ledger. If a blockchain is used, then the system may use different techniques to append data to the blockchain. In a first instance, the system may store the hash of the metafile in the blockchain and store the detail of the metafiles off the blockchain. In this instance, the blockchain may be a ledger. In a second instance, the system may follow the blockchain rules to encode data and store metafile instructions in a blockchain where rules can be extracted.

In additional detail, the system may create an authentication schema. The metafile input may be as described in the following discussion. The description may provide for a standardized description of user attributes and system authentication rules and procedures. The output may be text based markup, and markup language is a design consideration. The storage may be an administrative metafile container. Administrative containers may hold all unique properties of a secure data broker owner, and file type and format is a design consideration. The interface may include creation through command line and hosted API is sufficient for MVP. The interface may enable rapid development of basic web user interfaces as needed. The technology may include a WSo2 API gateway and identity server, which may be a stack offering. The schema may be multi-level and/or hierarchical. The business entity may be an organization, a business, and/or a department. The user roles may be administrator, engineer, and/or analyst. The object roles may be data, network, and/or container. The rules and policy may include an WSo2 identity server that supports XACML rule processing. In some implementations, metafile creation will support a standardized subset of rule based expressions. In some implementations, scenario development should elucidate functional requirements. There may be a valid scope cut for pilot.

The system may create a source data object authentication policy that is described in the following discussion. The description may provide for the creation of authentication rules and policy specifically targeting a single source data object. The output may be text based markup, where markup language is a design consideration. The storage may be a unique metafile container referencing, in some implementations, one and only one source data object. The metafile may reference an administrative metafile for verification that schema and policy is currently valid. The metafile can additionally reference a source data object and data processing schema. The interface may be a command line. In some instances, a hosted API is sufficient for MVP. The interface may enable rapid development of a basic web user interface as needed.

The system may create source data object schema. This may include a metafile input that is described as follows. The description provides for a standardized description of data to be shared via the distributed a secure data broker system. The output may be text-based markup, where markup language is a design consideration. The storage may include central or individual metafile containers as a design option. The file type and format may be a design consideration. The interface may be a command line and/or a hosted API that is sufficient for MVP. The interface may enable rapid development of a basic web user interface as needed. The technology may be an WSo2 API gateway plus identity server that may be a standard stack offering. The schema may be based on markup language selection. The expressions and parameters may be defined by scenario functional requirements. An illustrative example, would be the expression "WinFile[ . . . ]" which would signify that the source data object is a Windows OS file with a referenceable file path and name contained within the brackets.

The system may create a data processing schema. This may include a metafile input that is described as follows. The description provides for a standardized description of code-like rules, instructions, parameters, and the like that may contain executable code, and that may always be linked to one and only one source data object via secure key reference. The output may be a text based markup, where markup language is a design consideration. The storage may include central or individual metafile containers as a design option. The file type and format may be a design consideration. The interface may include creation through command line, where hosted API is sufficient for MVP. The interface may enable rapid development of a basic web user interface as needed. The technology may be an WSo2 API gateway plus identity server that may be a standard stack offering. The schema may be based on markup language selection. Expressions and parameters may be defined by scenario functional requirements. In the case of the MVP, python may be chosen as the data processing language. An illustrative example of a standard expression in the data object schema would be "ProcPython[ . . . ]", with executable code nested within the brackets.

Figure 6A:
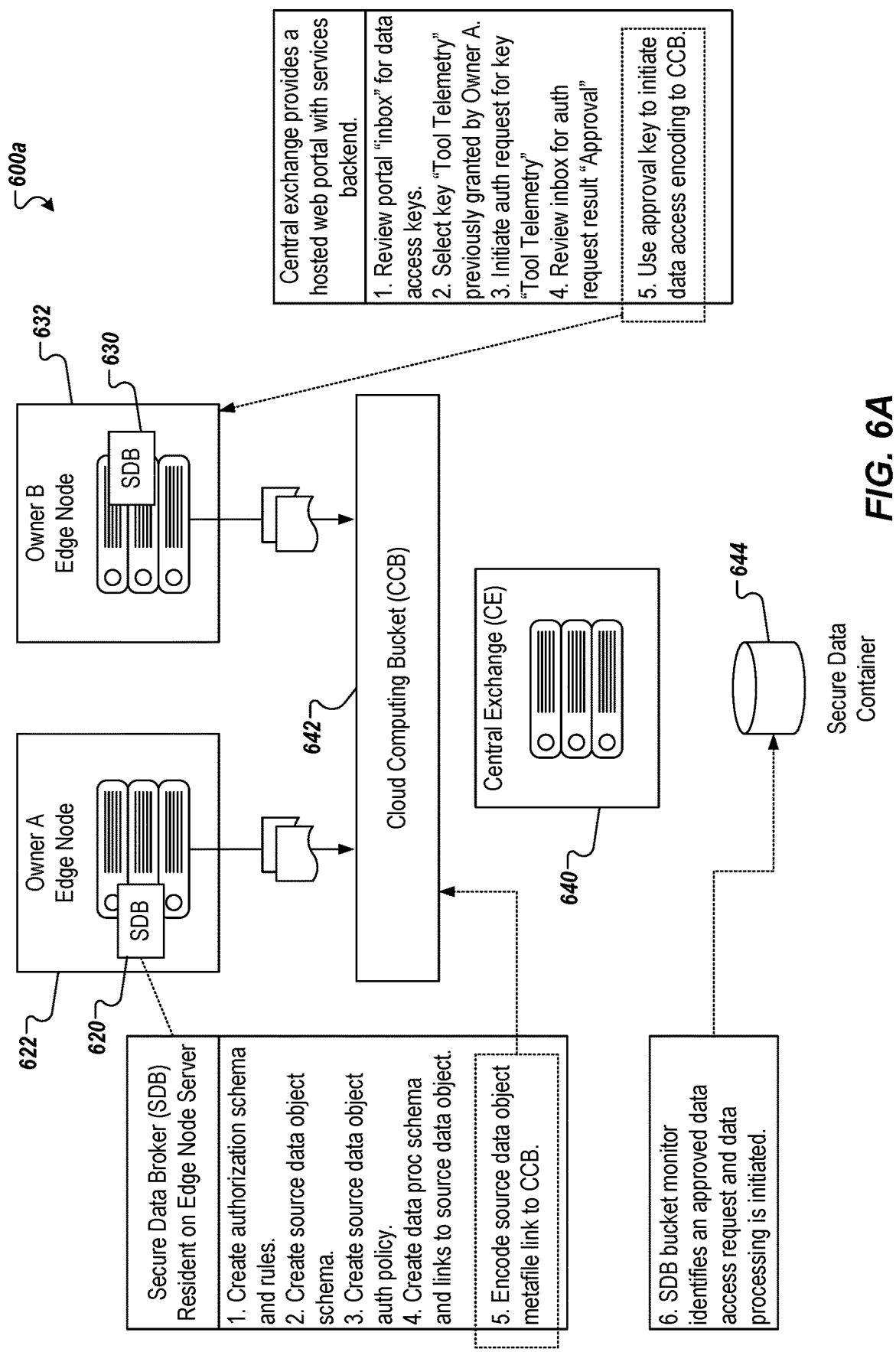
FIG. 6A illustrates an example scenario involving the creation of a secure data grant in accordance with implementations of the present disclosure.
Figure 6B:
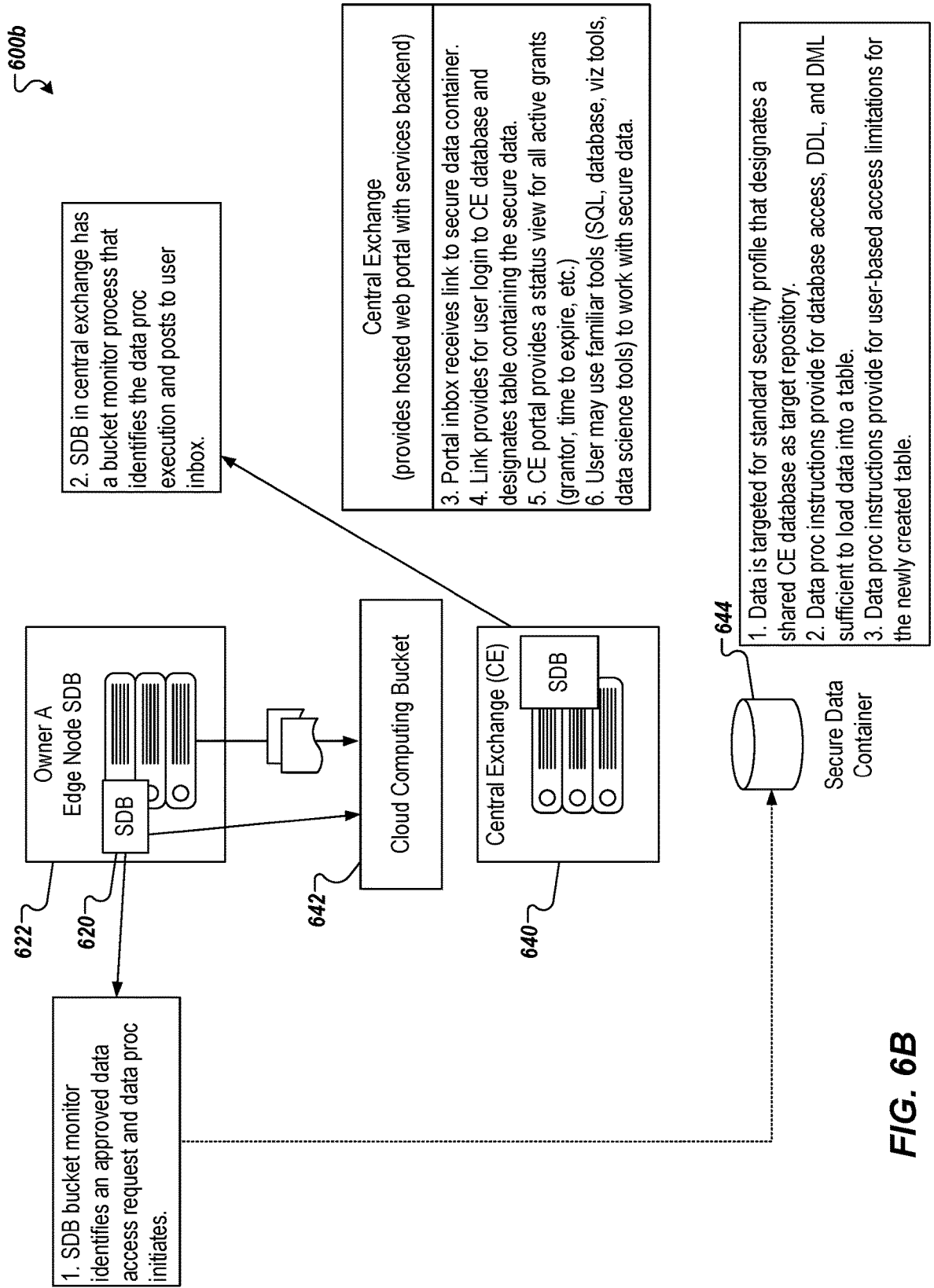
FIG. 6B illustrates an example scenario of accessing a secure data object in accordance with implementations of the present disclosure.

Implementations of the present disclosure are described in further detail herein with reference to FIGS. 6A and 6B. FIG. 6A illustrates an example scenario involving the creation of a secure data grant. FIG. 6B illustrates an example scenario of accessing a secure data object. In the example of FIGS. 6A and 6B, a SDB 620 is resident on an edge node 622 associated with a first data owner (e.g., Owner A). Further, a SDB 630 is resident on an edge node 632 associated with a second data owner (e.g., Owner B). In the depicted example, the first data owner and the second data owner work together in a cooperative effort, and the first data owner is to share sensitive data with the second data owner.

Accordingly, using the SDB 620, the first data owner creates the authorization schema and rules that are to be applied in the second data owner's access to a source data object (i.e., a data object that stores the data that is to be shared with the second data owner), creates a schema for the source data object, creates an authentication policy for accessing the source data object, and creates a data processing schema as well as one or more links to the source data object. For example, and as described herein, the first data owner uses the SDB 620 to generate an authentication metafile (e.g., the auth metafile 220 of FIG. 2), a secure data metafile (e.g., the secure data metafile 222 of FIG. 2), and a data processing metafile (e.g., the data processing metafile 224 of FIG. 2), as described herein. Further, each of the metafiles is provided to a central exchange 640 through a cloud computing bucket 642, as described herein. In some examples, a transaction is written to a secure data container 644 and is addressed to one or more other data owners (e.g., the second data owner) based on respective UUIDs.

In some implementations, a chain monitor process is executed by a SDB, located at an edge node, which periodically interrogates the cloud computing bucket 642 for transactions that have been added and that are addressed to its UUID (e.g., the UUID of the respective data owner). For example, in the example of FIGS. 6A and 6B, a chain monitor process executed on the edge node 632 for the second data owner can periodically interrogate the cloud computing bucket 642. In this manner, the edge node 632 can become aware of a transaction created by the first data owner (e.g., to access secure data of the first data owner). In some examples, in response to awareness of the transaction, a user can request access to and/or processing of the data underlying the transaction. In some examples, in response to the request, user credentials (e.g., username, UUID, password, biometrics) are processed to determined whether the owner of the data has enabled access to the particular user. If the user is authenticated (approved), access to and/or processing of the data can be executed with the central exchange, as defined within the set of metafiles, as described herein.

In some examples, one or more data access keys are facilitated through the central exchange 640. The data access keys are granted by an edge node of a data owner. For example, the first data owner of the edge node 622 grants data access keys to enable another data owner (e.g., the second data owner of the edge node 632) access to data. In some examples, a data owner cannot search for or request data access keys through the central exchange 640.

In some implementations, a user (e.g., an employee of a data owner) can log into the central exchange 640. In some examples, in response to the user login, the central exchange 640 initiates a scan of the cloud computing bucket 642 for any authentication keys that are associated with the data owner. For example, the central exchange 640 can scan for authentication keys (data access keys) that are associated with the UUID of the user that logged in. If a match is found, an inbox item is generated to inform the user that a data access key is available. In some implementations, the user can use an authentication key for an authentication request to access data. In some examples, the user cannot directly request or initiate a data transfer from an edge node even after authentication approval. Instead, in response to approval of the authentication request, a transaction is written to the cloud computing bucket and the transaction is identified by the respective edge node. The edge node can then initiate the data processing instructions, as described herein.

Figure 7:
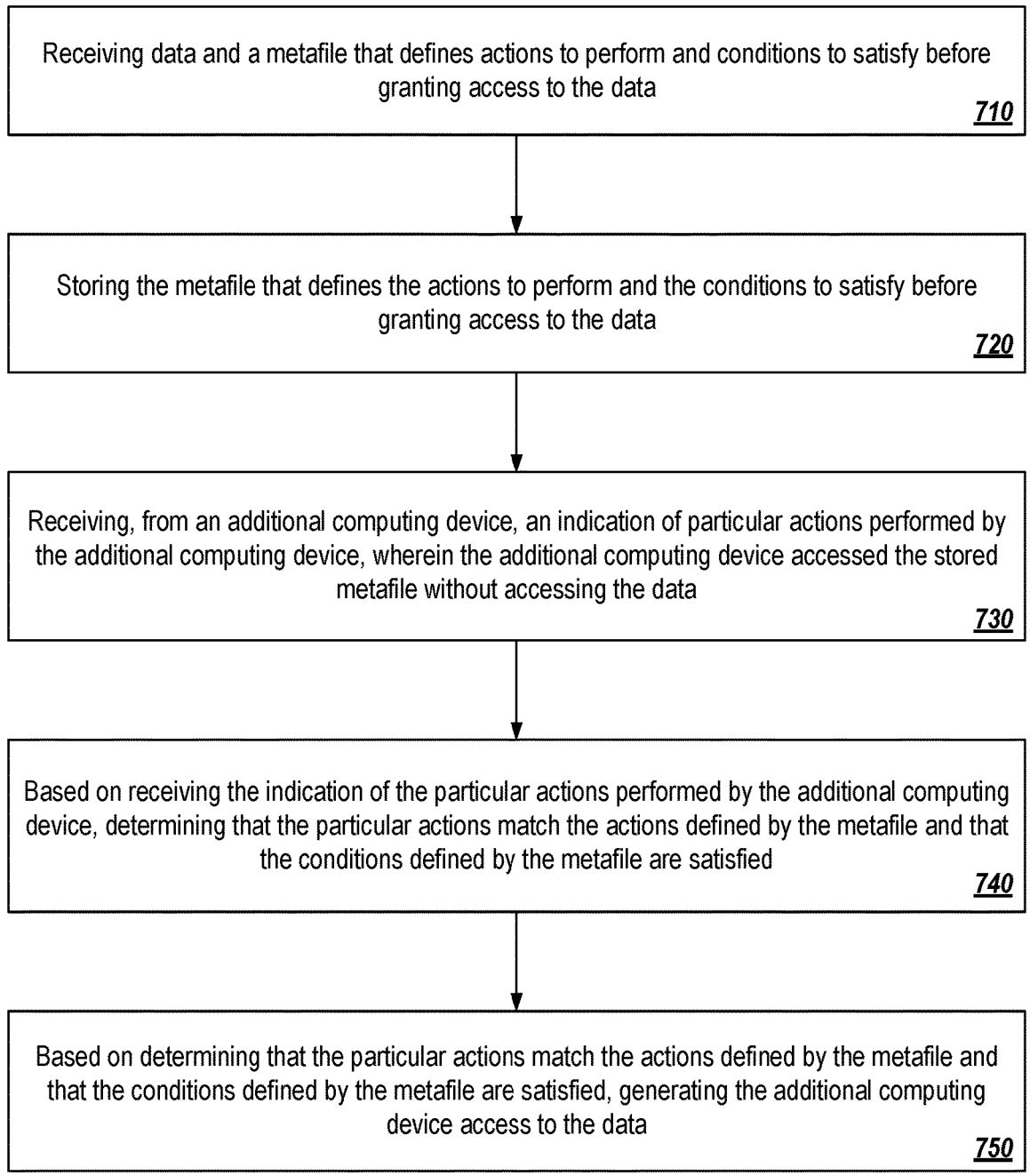
FIG. 7 illustrates an example process for asynchronous data access and distributed data processing in accordance with implementations of the present disclosure.

FIG. 7 illustrates an example process 700 for asynchronous data access and distributed data processing. The process 700 will be described as being performed by a computer system comprising one or more computers, for example, the system 100 of FIG. 1, the system 200 of FIG. 2, the system 500 of FIG. 5, or the system 600 of FIG. 6.

The system receives data and a metafile that defines actions to perform and conditions to satisfy before granting access to the data (710). The system stores the metafile that defines the actions to perform and the conditions to satisfy before granting access to the data (720). The system receives, from an additional computing device, an indication of particular actions performed by the additional computing device, wherein the additional computing device accessed the stored metafile without accessing the data (730). The system, based on receiving the indication of the particular actions performed by the additional computing device, determines that the particular actions match the actions defined by the metafile and that the conditions defined by the metafile are satisfied (740). The system, based on determining that the particular actions match the actions defined by the metafile and that the conditions defined by the metafile are satisfied, generates the additional computing device access to the data (750).

Figure 8:
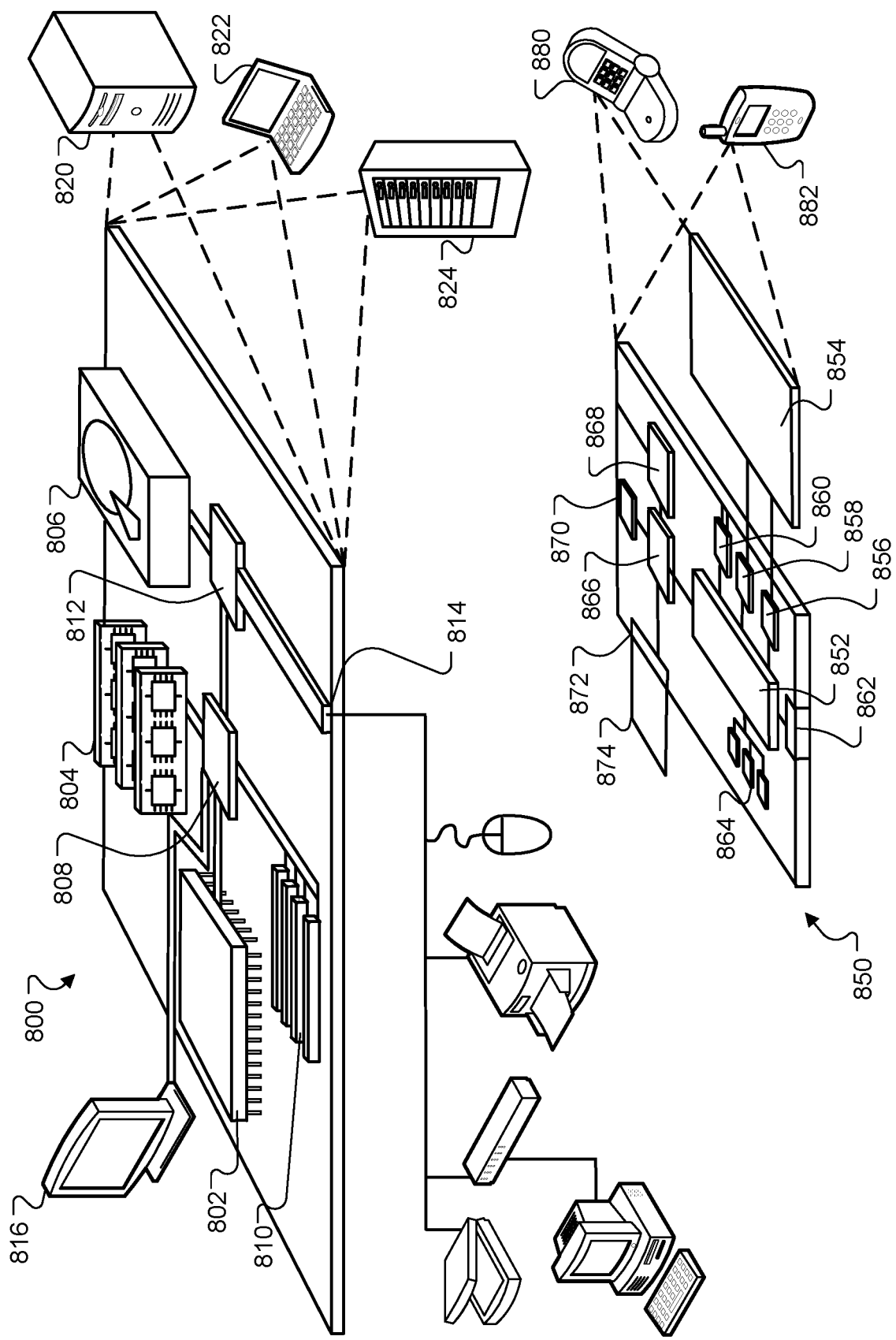
FIG. 8 is an example of a computing device and a mobile computing device.

FIG. 8 shows an example of a computing device 800 and a mobile computing device 850 that can be used to implement the techniques described here. The computing device 800 is intended to represent various forms of digital computers, such as laptops, desktops, workstations, personal digital assistants, servers, blade servers, mainframes, and other appropriate computers. The mobile computing device 850 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 may also be another form of computer-readable medium, such as a magnetic or optical disk.

The storage device 806 is capable of providing mass storage for the computing device 800. In some implementations, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 802), perform one or more methods, such as those described above. The instructions can also be stored by one or more storage devices such as computer- or machine-readable mediums (for example, the memory 804, the storage device 806, or memory on the processor 802).

The high-speed interface 808 manages bandwidth-intensive operations for the computing device 800, while the low-speed interface 812 manages lower bandwidth-intensive operations. Such allocation of functions is an example only. In some implementations, the high-speed interface 808 is coupled to the memory 804, the display 816 (e.g., through a graphics processor or accelerator), and to the high-speed expansion ports 810, which may accept various expansion cards (not shown). In the implementation, the low-speed interface 812 is coupled to the storage device 806 and the low-speed expansion port 814. The low-speed expansion port 814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device (not shown), such as a mobile computing device 850. Each of such devices may contain one or more of the computing device 800 and the mobile computing device 850, and an entire system may be made up of multiple computing devices communicating with each other.

The mobile computing device 850 includes a processor 852, a memory 864, an input/output device such as a display 854, a communication interface 866, and a transceiver 868, among other components. The mobile computing device 850 may also be provided with a storage device, such as a micro-drive or other device, to provide additional storage. Each of the processor 852, the memory 864, the display 854, the communication interface 866, and the transceiver 868, are interconnected using various buses, and several of the components may be mounted on a common motherboard or in other manners as appropriate.

The processor 852 can execute instructions within the mobile computing device 850, including instructions stored in the memory 864. The processor 852 may be implemented as a chipset of chips that include separate and multiple analog and digital processors. The processor 852 may provide, for example, for coordination of the other components of the mobile computing device 850, such as control of user interfaces, applications run by the mobile computing device 850, and wireless communication by the mobile computing device 850.

The processor 852 may communicate with a user through a control interface 858 and a display interface 856 coupled to the display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a SIMM (Single In Line Memory Module) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provide as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 852), perform one or more methods, such as those described above. The instructions can also be stored by one or more storage devices, such as one or more computer- or machine-readable mediums (for example, the memory 864, the expansion memory 874, or memory on the processor 852). In some implementations, the instructions can be received in a propagated signal, for example, over the transceiver 868 or the external interface 862.

The mobile computing device 850 may communicate wirelessly through the communication interface 866, which may include digital signal processing circuitry where necessary. The communication interface 866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 868 using a radio-frequency. In addition, short-range communication may occur, such as using a Bluetooth, WiFi, or other such transceiver (not shown). In addition, a GPS (Global Positioning System) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, e.g., in a handset of the mobile computing device 850. Such sound may include sound from voice telephone calls, may include recorded sound (e.g., voice messages, music files, etc.) and may also include sound generated by applications operating on the mobile computing device 850.

The mobile computing device 850 may be implemented in a number of different forms, as shown in the figure. For example, it may be implemented as a cellular telephone 880. It may also be implemented as part of a smart-phone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet. In some implementations, the systems and techniques described here can be implemented on an embedded system where speech recognition and other processing is performed directly on the device.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method for secure data access between multiple entities, the method comprising:
   accessing, by a central exchange server, a set of metafiles that define rules and conditions for sharing data stored on a first system with a second system,
      wherein the set of metafiles includes an authentication key that is associated with the second system and generated by the first system to allow the second system to access the data stored on the first system;
      wherein the set of metafiles are created by the first system and published in a blockchain network,
      wherein the central exchange server accesses the set of metafiles from the blockchain network without accessing the data;
   determining, by the central exchange server, that a user of the second system logs into the central exchange server,
   upon determining that the user of the second system logs into the central exchange server, initiating, by the central exchange server, a scan of the set of metafiles to look for the authentication key that is associated with the second system;
   in response to identifying a match, informing, by the central exchange server, the second system that the authentication key is available for the second system to access the data stored on the first system;
   receiving, by the central exchange server from the second system, a request to access the data stored on the first system using the authentication key;
   determining, by the central exchange server, that the request from the second system satisfies the rules and conditions that are defined in the set of metafiles; and
   in response to determining that the request from the first system satisfies the rules and conditions for accessing the data, permitting the second system to access the data of the first system.

2. The method of claim 1, wherein the set of metafiles comprises an authentication metafile that identifies one or more users of the second system allowed to use the data.

3. The method of claim 1, wherein the set of metafiles comprises a secure data metafile that provides one or more links to enable access to the data to enable the second system to use the data.

4. The method of claim 1, wherein the set of metafiles comprises a data processing metafile that provides computer-executable instructions that are executed for use of the data by the second system.

5. The method of claim 1, wherein the set of metafiles is generated by a secure data broker that is resident on an edge node of the first system, the edge node transmitting the set of metafiles to the blockchain network.

6. The method of claim 1, wherein the data is associated with an expiration, and after the expiration, the data is no longer usable by the second system based on the set of metafiles.

7. The method of claim 1, wherein the blockchain network is provided by a cloud-computing platform that enables indirect communication between the first system and the central exchange server to enable use of the data by the second system.

8. A non-transitory computer-readable storage medium coupled to one or more processors and having instructions stored thereon which, when executed by the one or more processors, cause the one or more processors to perform operations for secure data access between multiple entities, the operations comprising:
   accessing, by a central exchange server, a set of metafiles that define rules and conditions for sharing data stored on a first system with a second system,
      wherein the set of metafiles includes an authentication key that is associated with the second system and generated by the first system to allow the second system to access the data stored on the first system;
      wherein the set of metafiles are created by the first system and published in a blockchain network,
      wherein the central exchange server accesses the set of metafiles from the blockchain network without accessing the data;
   determining, by the central exchange server, that a user of the second system logs into the central exchange server,
   upon determining that the user of the second system logs into the central exchange server, initiating, by the central exchange server, a scan of the set of metafiles to look for the authentication key that is associated with the second system;
   in response to identifying a match, informing, by the central exchange server, the second system that the authentication key is available for the second system to access the data stored on the first system;
   receiving, by the central exchange server from the second system, a request to access the data stored on the first system using the authentication key;
   determining, by the central exchange server, that the request from the second system satisfies the rules and conditions that are defined in the set of metafiles; and
   in response to determining that the request from the first system satisfies the rules and conditions for accessing the data, permitting the second system to access the data of the first system.

9. The computer-readable storage medium of claim 8, wherein the set of metafiles comprises an authentication metafile that identifies one or more users of the second system allowed to use the data.

10. The computer-readable storage medium of claim 8, wherein the set of metafiles comprises a secure data metafile that provides one or more links to enable access to the data to enable the second system to use the data.

11. The computer-readable storage medium of claim 8, wherein the set of metafiles comprises a data processing metafile that provides computer-executable instructions that are executed for use of the data by the second system.

12. The computer-readable storage medium of claim 8, wherein the set of metafiles is generated by a secure data broker that is resident on an edge node of the first system, the edge node transmitting the set of metafiles to the blockchain network.

13. The computer-readable storage medium of claim 8, wherein the data is associated with an expiration, and after the expiration, the data is no longer usable by the second system based on the set of metafiles.

14. The computer-readable storage medium of claim 8, wherein the blockchain network is provided by a cloud-computing platform that enables indirect communication between the first system and the central exchange server to enable use of the data by the second system.

15. A system, comprising:
a computing device; and
a computer-readable storage device coupled to the computing device and having instructions stored thereon which, when executed by the computing device, cause the computing device to perform operations for secure data access between multiple entities, the operations comprising:
accessing, by a central exchange server, a set of metafiles that define rules and conditions for sharing data stored on a first system with a second system,
wherein the set of metafiles includes an authentication key that is associated with the second system and generated by the first system to allow the second system to access the data stored on the first system;
wherein the set of metafiles are created by the first system and published in a blockchain network,
wherein the central exchange server accesses the set of metafiles from the blockchain network without accessing the data;
determining, by the central exchange server, that a user of the second system logs into the central exchange server,
upon determining that the user of the second system logs into the central exchange server, initiating, by the central exchange server, a scan of the set of metafiles to look for the authentication key that is associated with the second system;
in response to identifying a match, informing, by the central exchange server, the second system that the authentication key is available for the second system to access the data stored on the first system;
receiving, by the central exchange server from the second system, a request to access the data stored on the first system using the authentication key;
determining, by the central exchange server, that the request from the second system satisfies the rules and conditions that are defined in the set of metafiles; and
in response to determining that the request from the first system satisfies the rules and conditions for accessing the data, permitting the second system to access the data of the first system.

16. The system of claim 15, wherein the set of metafiles comprises an authentication metafile that identifies one or more users of the second system allowed to use the data.

17. The system of claim 15, wherein the set of metafiles comprises a secure data metafile that provides one or more links to enable access to the data to enable the second system to use the data.

18. The system of claim 15, wherein the set of metafiles comprises a data processing metafile that provides computer-executable instructions that are executed for use of the data by the second system.

19. The system of claim 15, wherein the set of metafiles is generated by a secure data broker that is resident on an edge node of the first system, the edge node transmitting the set of metafiles to the blockchain network.

20. The system of claim 15, wherein the data is associated with an expiration, and after the expiration, the data is no longer usable by the second system based on the set of metafiles.

21. The system of claim 15, wherein the blockchain network is provided by a cloud-computing platform that enables indirect communication between the first system and the central exchange server to enable use of the data by the second system.

\* \* \* \* \*